United States Patent
Hirota

(10) Patent No.: US 10,480,588 B2
(45) Date of Patent: Nov. 19, 2019

(54) MULTI-PLATE CLUTCH

(71) Applicant: GKN Driveline Japan Ltd, Tochigi, Tochigi (JP)

(72) Inventor: Isao Hirota, Tochigi (JP)

(73) Assignee: GKN Driveline Japan Ltd, Tochigi (JP)

(*) Notice: Subject to any disclaimer, the term of this patent is extended or adjusted under 35 U.S.C. 154(b) by 5 days.

(21) Appl. No.: 15/947,904

(22) Filed: Apr. 9, 2018

(65) Prior Publication Data

US 2018/0223914 A1    Aug. 9, 2018

Related U.S. Application Data

(63) Continuation of application No. PCT/JP2016/054413, filed on Feb. 16, 2016.

(51) Int. Cl.
| | |
|---|---|
| *F16D 13/62* | (2006.01) |
| *F16D 13/64* | (2006.01) |
| *F16D 13/74* | (2006.01) |
| *F16D 69/00* | (2006.01) |

(52) U.S. Cl.
CPC .......... *F16D 13/62* (2013.01); *F16D 13/648* (2013.01); *F16D 13/74* (2013.01); *F16D 2069/004* (2013.01)

(58) Field of Classification Search
CPC ........ F16D 13/62; F16D 13/64; F16D 13/648; F16D 13/74; F16D 2200/0052;
(Continued)

(56) References Cited

U.S. PATENT DOCUMENTS

| | | | | |
|---|---|---|---|---|
| 5,615,758 A | * | 4/1997 | Nels | .......................... B32B 5/08 |
| | | | | 192/113.36 |
| 6,454,072 B1 | * | 9/2002 | Merkel | ................. F16D 25/064 |
| | | | | 192/107 R |

(Continued)

FOREIGN PATENT DOCUMENTS

| | | |
|---|---|---|
| CN | 101646878 A | 2/2010 |
| JP | H11-201183 A | 7/1999 |

(Continued)

OTHER PUBLICATIONS

International Search Report and Written Opinion for PCT/JP2016/054413 dated Apr. 19, 2016 (with English translation; 10 pages).

(Continued)

*Primary Examiner* — Charles A Fox
*Assistant Examiner* — Lori Wu
(74) *Attorney, Agent, or Firm* — Bejin Bieneman PLC

(57) ABSTRACT

A multi-plate clutch is comprised of: one or more core plates respectively coupled with a first rotary body rotatable about an axis; one or more reaction plates arranged alternately with the core plates and respectively coupled with a second rotary body rotatable about the axis, the reaction plates receiving the pressure force from the driver mechanism to brake the first rotary body relative to the second rotary body; one or more friction members respectively fixed to faces on the respective core plates, the faces to come into contact with the reaction plates, and including a bundle of warp yarns and a bundle of weft yarns mutually weaved perpendicular to each other, the yarns being formed of carbon fibers; and a plurality of bottomed grooves formed on faces on the respective reaction plates, the faces to come into contact with the core plates.

7 Claims, 6 Drawing Sheets

(58) Field of Classification Search
CPC ......... F16D 2200/006; F16D 2069/004; F16D 2069/023
See application file for complete search history.

(56) References Cited

U.S. PATENT DOCUMENTS

| | | | | |
|---|---|---|---|---|
| 2005/0025951 | A1* | 2/2005 | Gruber | C04B 35/83 428/299.1 |
| 2008/0308378 | A1 | 12/2008 | Abe et al. | |
| 2009/0078527 | A1* | 3/2009 | Mordukhovich | F16D 13/64 192/107 C |
| 2010/0006388 | A1* | 1/2010 | Fabricius | F16D 13/648 192/113.36 |
| 2014/0182995 | A1* | 7/2014 | Ando | F16D 13/62 192/107 R |

FOREIGN PATENT DOCUMENTS

| | | | | | |
|---|---|---|---|---|---|
| JP | 2002-195291 | A | | 7/2002 | |
| JP | 2003-090371 | A | | 3/2003 | |
| JP | 2003-240034 | A | | 8/2003 | |
| JP | 2005-214284 | A | | 8/2005 | |
| JP | 2005308183 | A | * | 11/2005 | ............. F16D 13/64 |
| JP | 2008-309317 | A | | 12/2008 | |
| WO | 2009004830 | A1 | | 1/2009 | |

OTHER PUBLICATIONS

Japanese Patent Office Notice of Rejection Reasons for Japanese Patent Application No. 2017-567853 dated Dec. 18, 2018 (11 pages; with English translation).

* cited by examiner

MULTI-PLATE CLUTCH

CROSS-REFERENCE TO RELATED APPLICATIONS

This application claims priority to and is a continuation Application of PCT International Application No. PCT/JP2016/054413 (filed Feb. 16, 2016), the entire contents of which are incorporated herein by reference.

BACKGROUND

Multi-plate clutches are often applied to vehicle drivetrains for the purpose of controlling torque transmission, or limiting differential motions. While lubricant oil is filled in devices constituting a vehicle drivetrain, generally this oil is further used to operate the multi-plate clutches in a mode of a wet type. While the multi-plate clutches create sufficiently large braking force if sufficient connection force is applied thereto, moderate reduction in the connection force, according to its degree, leads to moderate reduction of the braking force as the lubricant oil promotes slippage among the clutch plates, thereby enabling continuous control of the torque transmission or control of the degree of the differential motion limitation.

Because the slippage among the clutch plates frequently occurs, although the lubricant oil intervenes, the respective clutch plates unavoidably suffer abrasion. Wear particles will spread over and therefore degrade the lubricant oil. Further the wear particles suspended in the lubricant oil can accumulate in other constituents of the drivetrain and then give rise to drag on its operation.

To prevent clutches from overheating, or for any other purpose, generally, one group of the plates of a multi-plate clutch contains friction members adhered thereon. Generally available are paper friction members formed of pulp or synthetic fibers; vacant pores among fibers thereof contribute to preservation of the lubricant oil to maintain its lubrication property. Further, carbon powder, as an antifriction material, is often made to be supported in these pores. Japanese Patent Application Laid-open No. H11-201183 discloses a related art.

SUMMARY

The present disclosure relates to a multi-plate clutch including a friction member formed of carbon fibers, and in particular to a wet-type multi-plate clutch including a friction member formed of warp yarns and weft yarns both formed of carbon fibers and woven together.

Based on study of the abrasion property of the friction members of carbon fibers, it has been discovered that the warp yarns are worn more than the weft yarns. Unevenness in abrasion works against various properties of a multi-plate clutch and, for example, may cause frequent overheating. The present disclosure addresses the problem that the warp yarns are more worn.

A multi-plate clutch used in combination with a driver mechanism capable of applying pressure force in a direction along an axis, is comprised of: one or more core plates respectively coupled with a first rotary body rotatable about the axis; one or more reaction plates arranged alternately in a direction along the axis with the core plates and respectively coupled with a second rotary body rotatable about the axis, the reaction plates receiving the pressure force from the driver mechanism to move in the direction along the axis and come into frictional contact with the core plates to brake the first rotary body relative to the second rotary body; one or more friction members respectively fixed to faces on the respective core plates, the faces to come into contact with the reaction plates, and including a bundle of warp yarns and a bundle of weft yarns woven perpendicularly to each other, the yarns being formed of carbon fibers; and a plurality of bottomed grooves formed on faces on the respective reaction plates, the faces to come into contact with the core plates.

DESCRIPTION OF EMBODIMENTS

Exemplary embodiments will be described hereinafter with reference to FIGS. 1 through 6B. In these drawings, the reference sign F depicts the direction toward the vehicle's front, A depicts the direction toward the rear, R depict the direction toward the right, and L depicts the direction toward the left.

Throughout the following description and the appended claims, an axis means a central axis of a clutch unless described otherwise. Further, while the front and the rear, or the right and the left, are often discriminated, this is merely for the convenience of explanation and therefore does not limit disclosed embodiments.

A multi-plate clutch according to the present embodiment is preferably applicable to any device such as a transmission, a torque manager or a limited-slip differential (LSD) constituting a drivetrain, but is of course not limited thereto.

Figure 1:
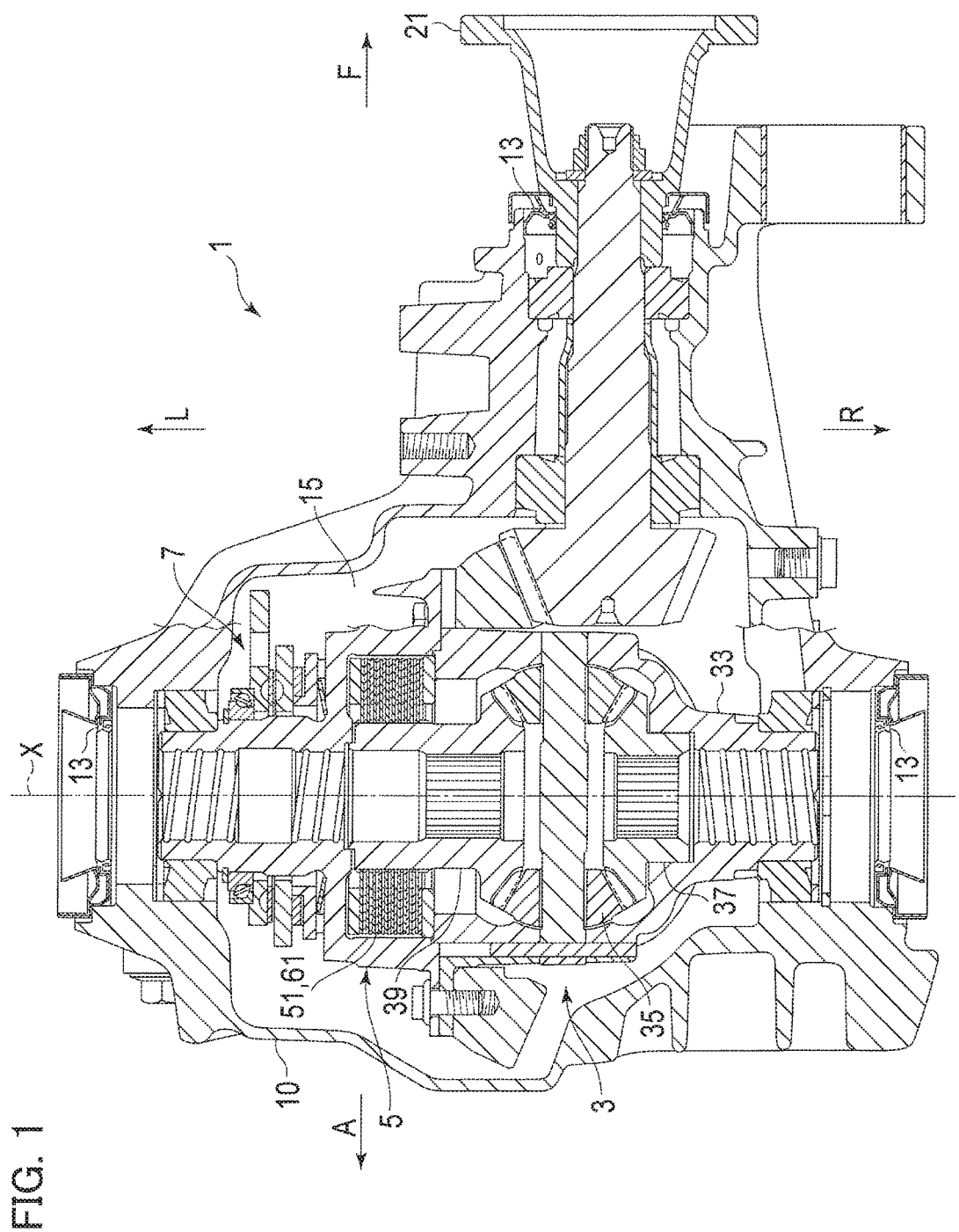
FIG. 1 is a longitudinal sectional view of a final drive comprised of a multi-plate clutch.

A final drive 1 exemplified in FIG. 1 is an example to which the multi-plate clutch is applied. The final drive 1 differentially distributes torque transmitted from a propeller shaft to a pair of rear axles. Its casing 10 defines a single chamber 15 in the interior thereof and, in the chamber 15, houses a differential gear set 3, a multi-plate clutch 5, and a drive mechanism 7 for controlling the clutch. An input shaft 21 at the front is coupled with the propeller shaft to receive its torque, and the differential gear set 3 intervenes to output the torque to the pair of rear axles toward both sides. The multi-plate clutch 5 limits differential motion of the differential gear set 3.

The input shaft 21 transmits the received torque through gearing to the differential gear set 3. The differential gear set 3 is in general provided with a casing 33 receiving the input torque to rotate about an axis X, and a plurality of pinions 35 rotating along therewith, and differentially outputs the torque to a pair of side gears 37, 39 respectively in mesh with the pinion gears 35. The respective side gears 37, 39 are coupled with right and left rear axles.

By putting lubricant oil into the chamber 15 and putting sealing members 13 to provide a liquid-tight seal around the input shaft 21 and the axles, the lubricant oil is confined in the interior. The lubricant oil, as following revolution of the casing 33 and the respective gears, circulates throughout the chamber 15 to lubricate various elements including the multi-plate clutch 5.

The multi-plate clutch 5 and the drive mechanism 7 are so supported as to be coaxial with the differential gear set 3 and are, in the axial direction, adjacent to each other. Although the multi-plate clutch 5 is rotatable about the axis X, the drive mechanism 7 is anti-rotated. Further, the drive mechanism 7 exerts pressure force on the multi-plate clutch 5 in the direction along the axis X.

The multi-plate clutch 5 is provided with a plurality of clutch plates 51, 61, in which the inner clutch plates 51 and the outer clutch plates 61 are arranged alternately. The inner clutch plates 51 are drivingly coupled with the side gear 39 and the outer clutch plates 61 are drivingly coupled with the casing 33. When the pressure force by the drive mechanism 7 acts thereon, the clutch plates 51, 61 mutually come into contact and, by mutually braking frictionally, brake the side gear 39 relative to the casing 33. Specifically, the multi-plate clutch 5 limits differential motion of the differential gear set 3.

In the example described below, the inner clutch plates 51 are core plates having the friction members and the outer clutch plates 61 are reaction plates, but this relation may be reversed.

Figure 2:
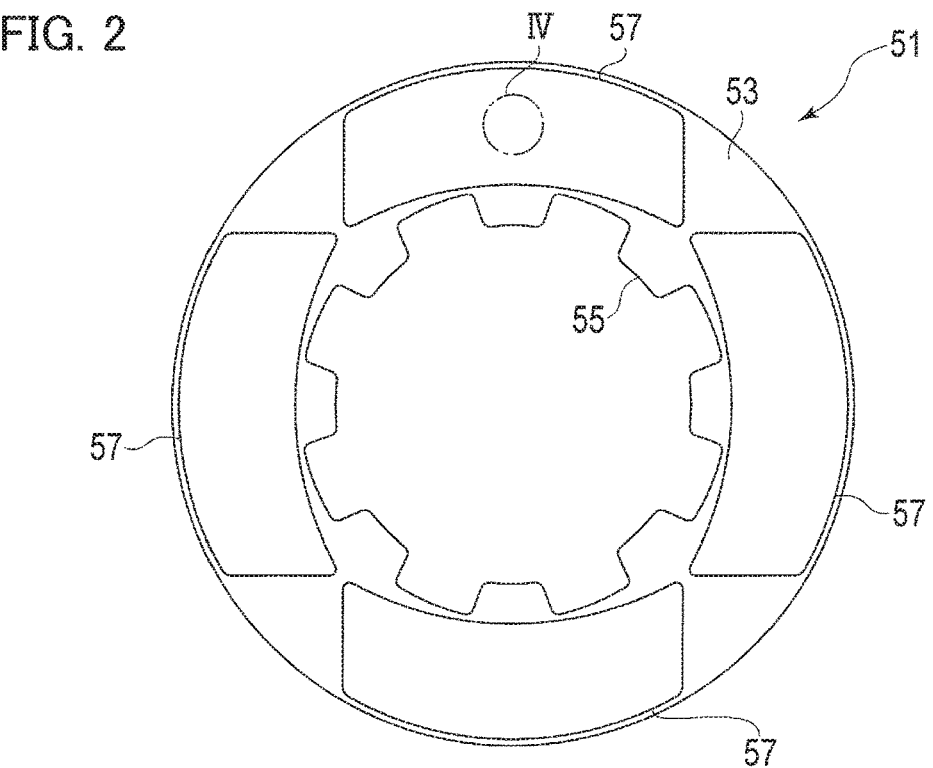
FIG. 2 is a plan view of a core plate having a friction member.

Referring to FIG. 2, each inner clutch plate 51 is a relatively thin plate formed of a stiff material such as a low-carbon steel, and its entire shape is generally circular. The center of the circle substantially coincides with the axis X. From the internal periphery of the circle, a plurality of keys 55 project radially inwardly and these keys 55 are in mesh with splines of the side gear 39. The inner clutch plates 51 are thereby drivingly coupled with the side gear 39 and are nevertheless movable in the direction along the axis X.

Each inner clutch plate 51, normally on both sides thereof, has faces 53 opposed to the adjacent outer clutch plates 61, and one or more friction plates 57 are fixed to each of these faces 53 by means of adhesive. Each friction plate 57 may be in a shape of a unitary circle or, as shown in the drawings, a plurality of friction plates 57 may be arranged as a circle. As the friction plates 57 slightly project from both the faces 53 of each inner clutch plate 51, what comes into contact with the outer clutch plates 61 are these friction plates 57.

Figure 4:
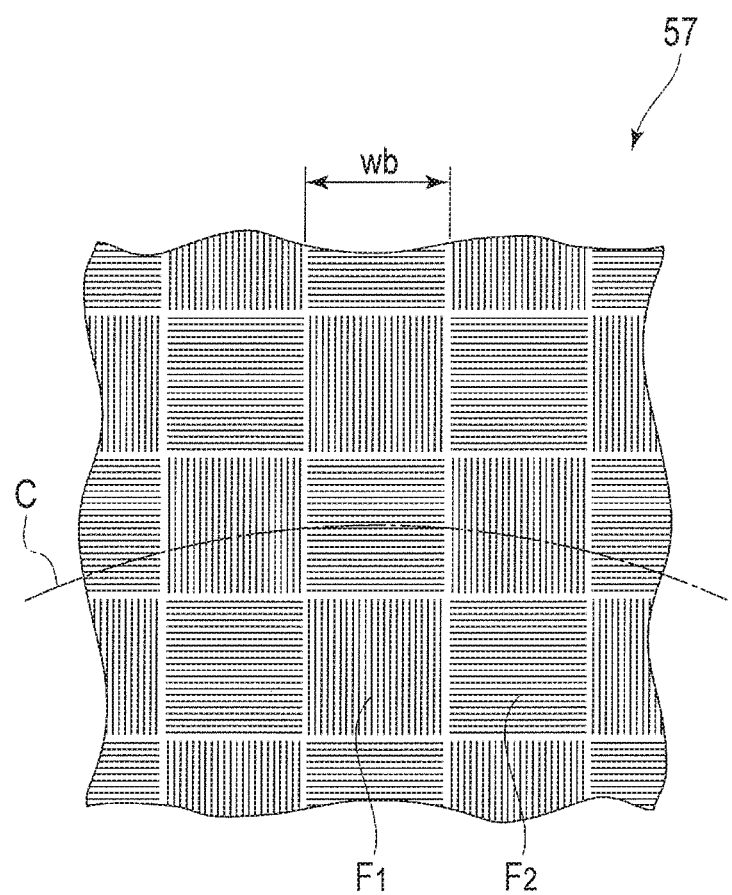
FIG. 4 is a schematic plan view of a surface of the friction member.

Referring to FIG. 4, each friction plate 57 is formed of carbon fibers. Warp yarns F1 of the carbon fibers, from several tens through hundreds thereof, are aligned in parallel to form a fiber bundle, and weft yarns F2 of the carbon fibers are similarly aligned to form a fiber bundle. These fiber bundles are woven together to cross each other at right angles, thereby forming the friction plate 57. A width wb of these fiber bundles is for example no less than 1 mm and no more than 10 mm.

The friction plates 57 are as well so fixed to each inner clutch plate 51 as to be oriented in particular directions. Specifically, in the example shown in FIG. 4, at the center of the friction plate 57 as a reference point, the warp yarns F1 are parallel to radial directions from the axis X and the weft yarns F2 are parallel to a circumferential direction C about the axis X. However, the further from the reference point along the circumferential direction C, the more they deviate from parallelism. Thus, when each friction plate 57 is viewed totally, the weft yarns F2 form angles of from 0 to 45 degrees to the circumferential direction C, and the warp yarns F1 form angles from 45 to 90 degrees to the circumferential direction C. The reference point is not limited to the center of the friction plate 57 but may be an end thereof for example.

Figure 3:
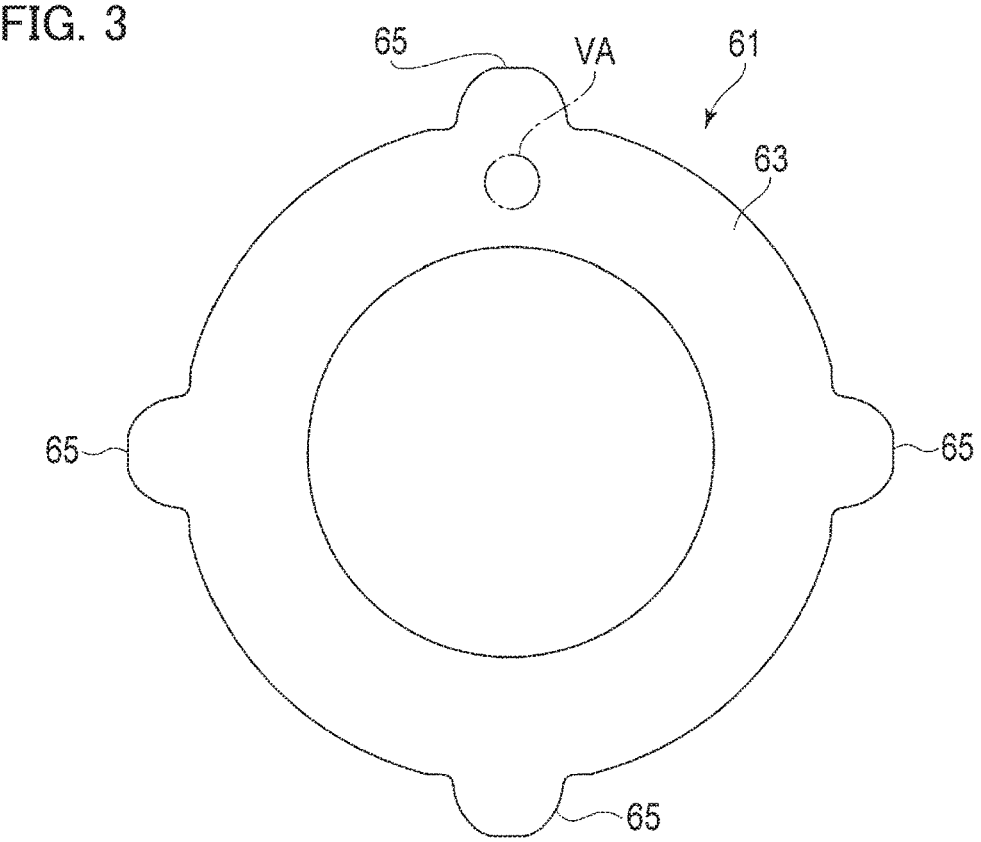
FIG. 3 is a plan view of a reaction plate having bottomed grooves.

Referring to FIG. 3, each outer clutch plate 61 is also a relatively thin plate formed of a stiff material such as a low-carbon steel, and its entire shape is generally circular. The center of the circle substantially coincides with the axis X. From the external periphery of the circle, a plurality of tabs 65 projects radially outwardly, and these tabs 65 are in mesh with keyways of the casing 33. The outer clutch plates 61 are thereby drivingly coupled with the casing 33 and are nevertheless movable in the direction along the axis X.

Gaps among the warp yarns F1, and gaps among the weft yarns F2, can retain lubricant oil and, when the outer clutch plates 61 come into contact with the friction plates 57, this lubricant oil is supplied to and lubricates these interfaces. As each outer clutch plate 61 moves only in the circumferential direction C relative to the friction plates 57, the weft yarns F2 in parallel therewith continuously supply the lubricant oil while the warp yarns F1 very rapidly lose the ability to retain the lubricant oil. Consequently, locally on the warp yarns F1, loss of oil films would occur and therefore the warp yarns F1 would soon abrade.

To overcome the aforementioned problems, each outer clutch plate 61 is provided with a means for supplying lubricant oil to the warp yarns F1. This means is, for example, bottomed grooves 67, such as U-grooves, V-grooves, rectangular grooves or free-shaped grooves, formed respectively on the faces 63 of each outer clutch plate 61, which come into contact with the adjacent inner clutch plates 51. The bottomed grooves 67 can keep the lubricant oil in a larger amount than the gaps among the warp yarns F1 and among the weft yarns F2 do. The bottomed grooves 67, when moving relative to the outer clutch plates 61, supply the lubricant oil to the interfaces.

Figure 5A:
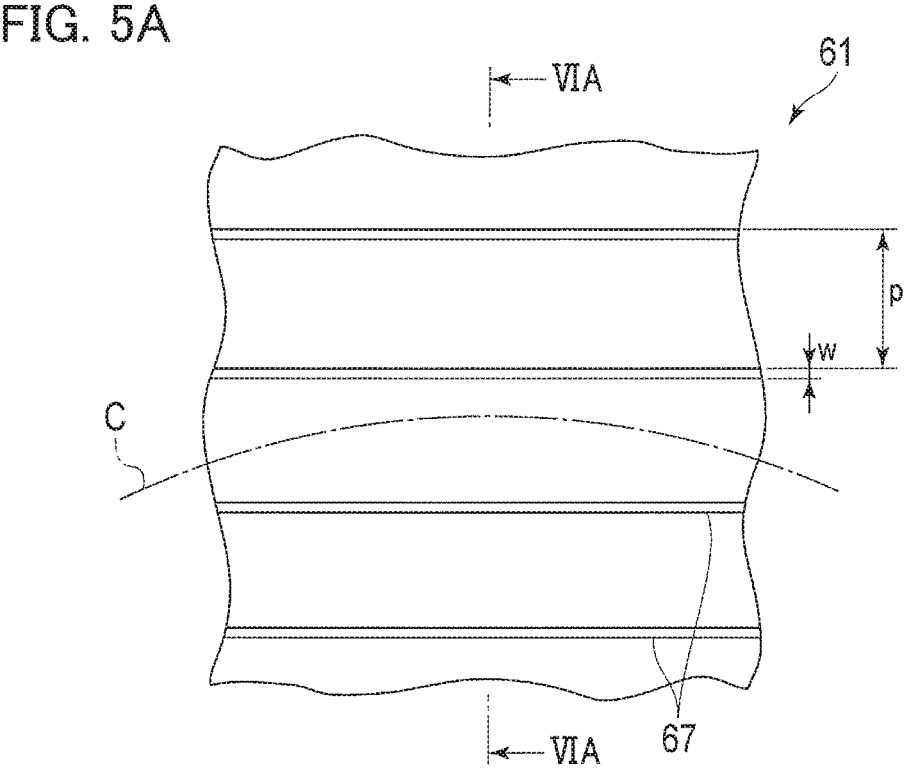
FIG. 5A is a schematic plan view of a surface of the reaction plate according to a first example.

Referring to FIG. 5A, according to an example, the bottomed grooves 67 are straight-line-like grooves running in parallel with each other throughout each face 63 of each outer clutch plate 61. When the outer clutch plates 61 are in motion in the circumferential direction C relative to the inner clutch plates 51, the bottomed grooves 67 become parallel to the warp yarns F1 (perpendicular to the weft yarns F2) at least two times per one revolution, and become perpendicular to the warp yarns F1 (parallel to the weft yarns F2) at least two times per one revolution. In this process, the lubricant oil is interchanged among the warp yarns F1, the weft yarns F2 and the bottomed grooves 67, and thereby the warp yarns F1, can receive supply of the lubricant oil. Therefore, local loss of oil films on the friction plates 57 will hardly occur and thus this successfully prevents uneven abrasion.

Figure 6A:
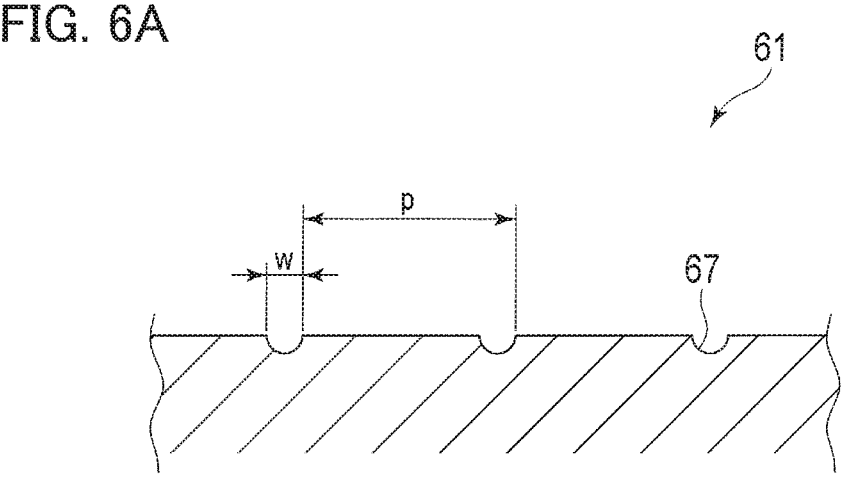
FIG. 6A is a sectional view of a reaction plate according to an example.
Figure 6B:
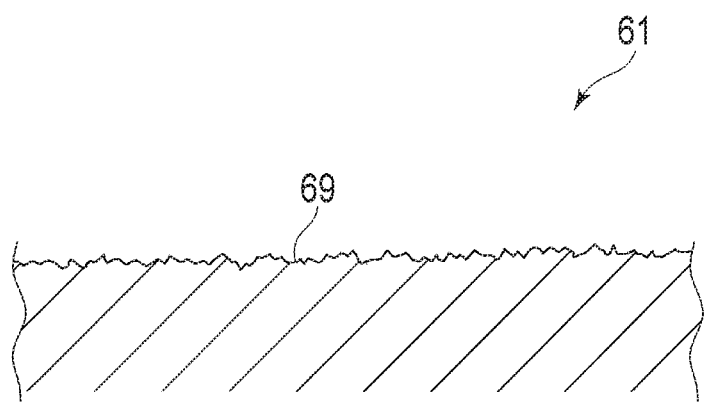
FIG. 6B is a sectional view of a reaction plate according to another example.

These bottomed grooves 67 can be formed by any method such as grinding, lathe turning, or machining. If grinding is applied for example, first a grinding wheel with relatively rough abrasive grains is rotated, and next the outer clutch plates 61 are made to pass in one direction below the rotating grinding wheel, thereby forming parallel and straight bottomed grooves 67. Grinding is advantageous in terms of production efficiency. In accordance with this method, as in the sectional view shown in FIG. 6B, adjacent bottomed grooves 67 are normally in contact with each other and the faces 63 of each outer clutch plate 61 become rough faces having textures 69. Alternatively, as shown in FIG. 6A, adjacent bottomed grooves 67 may be apart from each other to some degree. To form such bottomed groves 67, machining may be more suitable.

Although any bottomed grooves 67 having depths about several micrometers can create the aforementioned effects, they are preferably no less than 1 micrometer in depth as too shallow grooves may limit these effects. Alternatively, arithmetic mean roughness Ra of a grooves 67 is no less than 0.4 micrometer and no more than 1.3 micrometer. Still further alternatively, a maximum height Ry of a groove 67 is no less than 4.5 micrometer and no more than 13.0 micrometer. Further, as denser grooves would create more potent effects but smaller widths would limit the effects, the pitch p or the width w of the bottomed grooves 67 is preferably no less than 5 micrometers and no more than 2 mm, and more preferably no less than 5 micrometers and no more than 100 micrometers.

As described already, in regard to the pitch p or the width w of the bottomed grooves 67 and the width wb of the fiber bundle in the friction plates 57, arbitrary values can be selected from preferable ranges. Thus the pitch p or the width w of the bottomed grooves 67 may be determined as a relative value relative to the width wb of the fiber bundle. As a distribution of the bottomed grooves 67 becomes sparser relative to the width wb of the fiber bundle, a frequency of supplying the lubricant oil to the fiber bundles lessens. To the contrary, as it becomes denser, it is expected that the effects become more potent. Thus the pitch p or the width w of the bottomed grooves can be, for example, made smaller than the width wb of the fiber bundles. The pitch p or the width w can be determined in light of the width of the fiber bundles of the warp yarns F1 in particular.

Figure 5B:
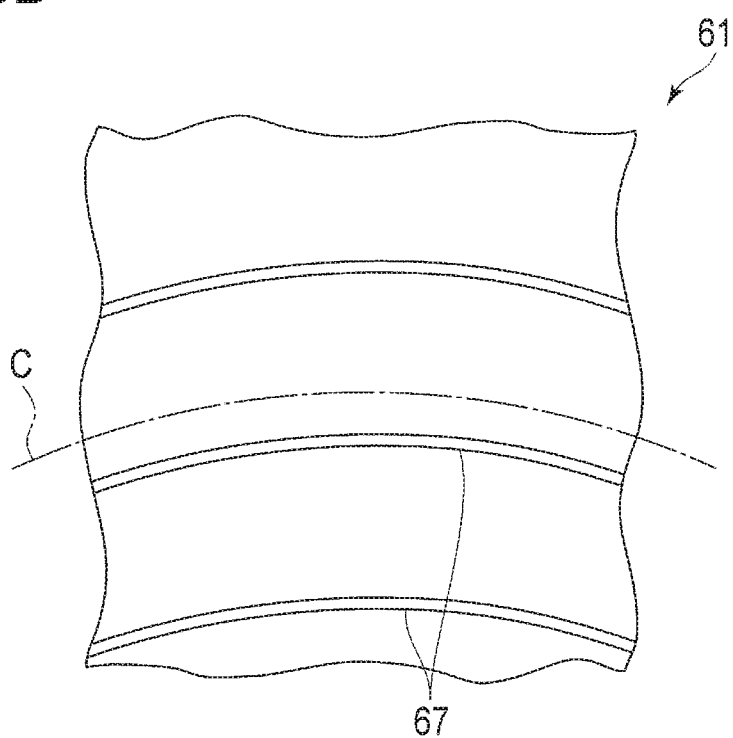
FIG. 5B is a schematic plan view of a surface of the reaction plate according to a second example.

The bottomed grooves 67 may be, alternatively, arcs or circles mutually coaxial along the circumferential direction C as shown in FIG. 5B. While such bottomed grooves 67 steadily cross the warp yarns F1 substantially at right angles and run substantially in parallel with the weft yarns F2, as the lubricant oil is steadily supplied via the bottomed grooves 67 to the warp yarns F1, local abrasion is similarly prevented.

The center of the arcs or the circles may coincide with the axis X or may deviate therefrom to some extent. When the outer clutch plates 61 rotates relative to the friction plates 57, in a case where the arcs or the circles are coaxial with the axis X, the bottomed grooves 67 steadily run along the constant sites on the friction plates 57, but in a case where they are non-coaxial with the axis X, they run with changing contact sites on the friction plates 57. To distribute the lubricant oil evenly on the interfaces, the latter structure is more advantageous. The arc-like or circle-like bottomed grooves 67 can be readily formed by lathe turning. Lathe turning is also advantageous in terms of production efficiency.

Figure 5C:
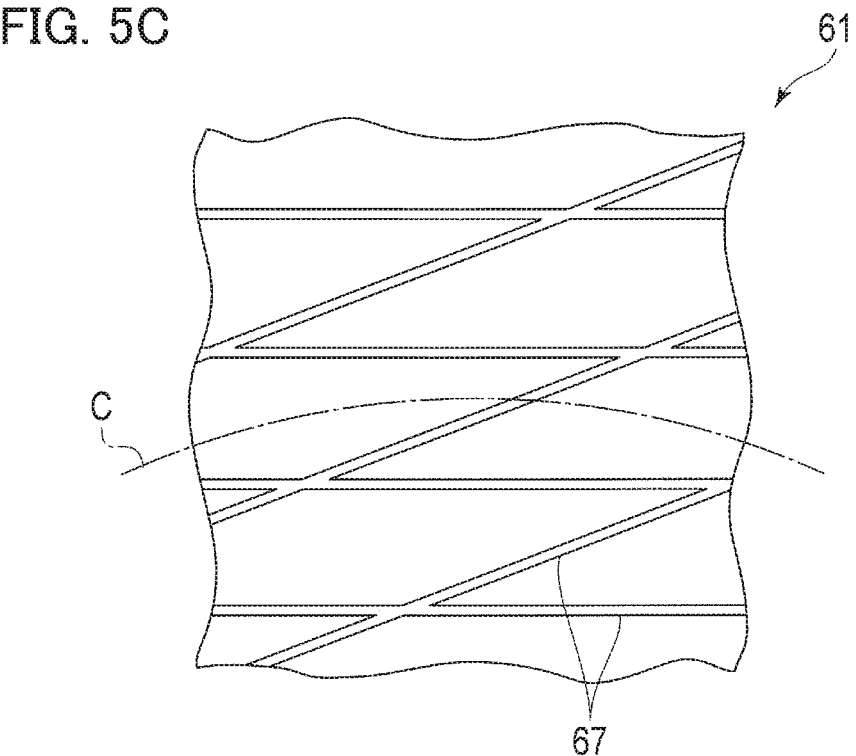
FIG. 5C is a schematic plan view of a surface of the reaction plate according to a third example.
Figure 5D:
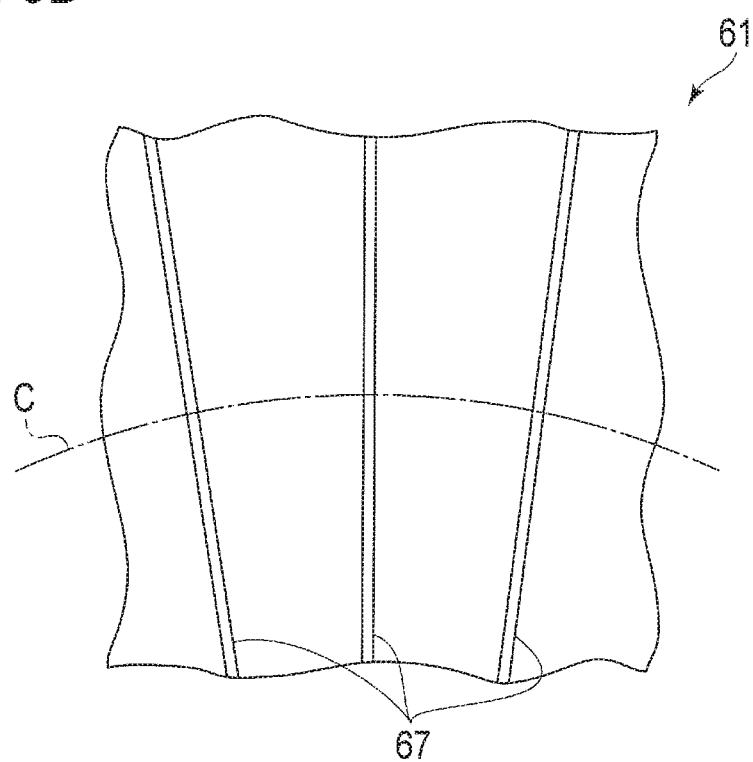
FIG. 5D is a schematic plan view of a surface of the reaction plate according to a fourth example.

Alternatively, the bottomed grooves 67 may be formed of straight lines or curves mutually forming certain angles as shown in FIG. 5C. Still further alternatively, the bottomed grooves 67 may be formed in radial lines or vortexes elongated from any properly selected center as shown in FIG. 5D. The center of the radial lines or the vortexes may coincide with the axis X or deviated therefrom to some extent. They may be disadvantageous in terms of production cost but works in favor of efficient circulation of the lubricant oil using centrifugal force.

Although certain exemplary embodiments have been described above, modifications and variations of the embodiments described above will occur to those skilled in the art, in light of the above teachings.

INDUSTRIAL APPLICABILITY

A multi-plate clutch that can prevent local abrasion is provided.

The invention claimed is:

1. A multi-plate clutch usable in combination with a driver mechanism capable of applying pressure force in a direction along an axis, comprising:
    one or more core plates respectively coupled with a first rotary body rotatable about the axis;
    one or more reaction plates arranged alternately in the direction along the axis with the core plates and respectively coupled with a second rotary body rotatable about the axis, the reaction plates arranged to receive the pressure force from the driver mechanism to move in the direction along the axis and come into frictional contact with the core plates to brake the first rotary body relative to the second rotary body;
    one or more friction members respectively fixed to faces on the respective core plates, the faces on the respective core plates being opposed to the reaction plates, the one or more friction members including a bundle of warp yarns and a bundle of weft yarns woven perpendicularly to each other, the yarns being formed of carbon fibers; and
    a plurality of bottomed grooves formed on faces on the respective reaction plates, the faces on the respective reaction plates arranged to come into contact with the one or more friction members,
    wherein the bottomed grooves form straight lines parallel with each other over the entirety of the faces on the respective reaction plates to coincide with the one or more friction members.

2. The multi-plate clutch of claim 1, wherein a pitch between the bottomed grooves is smaller than a width of the bundle of the warp yarns.

3. The multi-plate clutch of claim 1, wherein the bottomed grooves form arcs or circles coaxial with each other.

4. The multi-plate clutch of claim 1, wherein the bottomed grooves form radial lines oriented radially from the axis.

5. The multi-plate clutch of claim 1, wherein the bottomed grooves are at least one micrometer in depth.

6. The multi-plate clutch of claim 1, wherein the bottomed grooves are no less than five micrometers and no more than two millimeters in width.

7. The multi-plate clutch of claim 1, wherein the friction members are oriented so that the warp yarns form an angle from 45 to 90 degrees to a circumferential direction about the axis.

* * * * *